(12) United States Patent
Shieh et al.

(10) Patent No.: US 7,793,198 B2
(45) Date of Patent: Sep. 7, 2010

(54) INTEGRATED APPARATUS FOR MULTI-STANDARD OPTICAL STORAGE MEDIA

(75) Inventors: Jia-Horng Shieh, Chungho (TW); Jyh-Shin Pan, Hsin Chu Hsien (TW); Li-Lien Lin, Hsin Chu (TW)

(73) Assignee: Mediatek Inc., Hsin-Chu, Taiwan (CN)

( * ) Notice: Subject to any disclaimer, the term of this patent is extended or adjusted under 35 U.S.C. 154(b) by 0 days.

(21) Appl. No.: 12/433,229

(22) Filed: Apr. 30, 2009

(65) Prior Publication Data

US 2009/0217134 A1    Aug. 27, 2009

Related U.S. Application Data

(62) Division of application No. 11/056,194, filed on Feb. 14, 2005, now Pat. No. 7,543,215.

(51) Int. Cl.
*H03M 13/00* (2006.01)

(52) U.S. Cl. .............. 714/784; 714/763; 714/785; 714/756

(58) Field of Classification Search .............. 714/756, 714/758, 763, 781, 784, 785
See application file for complete search history.

(56) References Cited

U.S. PATENT DOCUMENTS

| | | | |
|---|---|---|---|
| 4,562,577 A | 12/1985 | Glover et al. | |
| 5,963,705 A * | 10/1999 | Kim et al. | 386/126 |
| 6,026,088 A * | 2/2000 | Rostoker et al. | 370/395.53 |
| 6,177,892 B1 * | 1/2001 | Ko | 341/106 |
| 6,233,394 B1 * | 5/2001 | Jeong et al. | 386/126 |
| 6,252,838 B1 | 6/2001 | Kuroda et al. | |
| 6,263,023 B1 * | 7/2001 | Ngai | 375/240.12 |
| 6,343,182 B1 * | 1/2002 | Kim et al. | 386/126 |
| 6,466,736 B1 * | 10/2002 | Chen et al. | 386/126 |
| 2004/0015771 A1 | 1/2004 | Lasser et al. | |
| 2004/0223435 A1 | 11/2004 | Nishi et al. | |
| 2005/0099910 A1 | 5/2005 | Sako et al. | |

* cited by examiner

*Primary Examiner*—Esaw T Abraham
(74) *Attorney, Agent, or Firm*—Birch, Stewart, Kolasch & Birch, LLP

(57) ABSTRACT

An integrated apparatus for multi-standard optical media includes a compact disc/digital versatile disc (CD/DVD) processor, a high-definition DVD (HDDVD) processor and a Blu-ray disc (BD) processor; a memory unit connected to the CD/DVD processor, the HDDVD processor and the BD processor to provide a storage resource; and a shared error correction code (ECC) engine for encoding or decoding the CD/DVD data stream, the HDDVD data stream and the BD data stream. Therein, the ECC engine further has a syndrome/parity generator to encode the data stream or to obtain the syndrome information from the data stream; and an erasure generator to obtain the possible error position information from the data stream. Thereby, the complexity and cost of the integrated apparatus can be reduced.

16 Claims, 7 Drawing Sheets

| SPEC | | Data Length | Parity Length | SPEC | (nibble base) | Data Length | Parity Length |
|---|---|---|---|---|---|---|---|
| BD | LDC | 216 | 32 | DVD | PO | 192 | 16 |
| | BIS | 30 | 32 | | PI | 172 | 10 |
| | DI | 112 | 32 | | BCA | 4n (1<=n<=12) | 4 |
| | BCA | 16 | 32 | | PREPITA | 3 | 3 |
| | AF | 5 | 4 | | PREPITB | 6 | 3 |
| | ADIP (Nibble base) | 14 | 6 | | ADIP (Nibble base) | 8 | 5 |
| AOD | PO | 192 | 16 | CD | C1 | 28 | 4 |
| | PI | 172 | 10 | | C2 | 24 | 4 |
| | BCA | 4n (1<=n<=12) | 4 | | C3(P) | 24 | 2 |
| | | | | | C3(Q) | 43 | 2 |

INTEGRATED APPARATUS FOR MULTI-STANDARD OPTICAL STORAGE MEDIA

This application is a Divisional of application Ser. No. 11/056,194, filed on Feb. 14, 2005, now U.S. Pat. No. 7,543,215 the entire contents of which are hereby incorporated by reference and for which priority is claimed under 35 U.S.C. §120.

BACKGROUND OF THE INVENTION

1. Field of the Invention

The present invention relates to an integrated apparatus for multi-standard optical media, and more particularly, to an integrated apparatus using shared error correction code (ECC) engines for encoding or decoding of various optical discs, including a compact disc (CD), a digital versatile disc (DVD), a high-definition DVD (HDDVD) and a Blu-ray disc (BD).

2. Description of Related Art

Conventionally, an integrated apparatus used for encoding or decoding of various optical discs, including a compact disc (CD), a digital versatile disc (DVD), a high-definition DVD (HDDVD) and a Blu-ray disc (BD), employs different decoding engines and memory units for optical discs having different standards. An example is shown in FIG. 1. As shown in the figure, in order to pick up data recorded on an optical disc 10, the conventional integrated apparatus includes a disc motor 101, an optical pickup unit (OPU) 103, a current/voltage amplifier (I/V Amp) 105, servo drivers 107, a servo 109 and a read channel 111.

In order to decode/encode the data of the optical disc 10, the integrated apparatus includes a CD/DVD process unit 121, a HDDVD process unit 123, a BD process unit 125, memory units (mem) 131, 133, 135, a CD/DVD error code correction and detection (ECC) engine 141, a HDDVD ECC engine 143, a BD ECC engine 145 and microprocessors (μp) 151, 153, 155.

The optical disc 10 can be a CD, a DVD, a HDDVD or a BD. The disc motor 101 typically includes a spindle motor, which rotates the optical disc 10 at a desired speed. The servo drivers 107 output an electric current to the disc motor 101 to drive and control the rotation rate the disc motor 101. The servo drivers 107 also output an electric current to the OPU 103 to position the OPU 103 on the desired location of the optical disc 10, to focus the laser beam onto the optical disc 10, and to track the recorded spiral pits on the optical disc 10.

As the optical disc 10 rotates, the OPU 103 reads information stored on the CD, DVD, HDDVD or BD by scanning the pits and lands on the optical disc 10. The OPU 103 may contain one or more lasers, optical elements, and associated electronic circuitry, and reads the information stored on the optical disc 10 by detecting the laser beam reflected from the optical disc 10. The OPU 103 is usually mounted on a sled, which physically positions OPU 103 over the optical disc 10. The OPU 103 is capable of reading information from the CD, DVD, HDDVD and BD.

The current/voltage amplifier 105 converts the photo-diode currents generated by the reflected laser beam into voltages, which are delivered to the read channel 111, and generates servo error control signals, which are fed back to the servo 109. The servo error control signals include a focus error signal, a tracking error signal, and a track-crossing pulse. Based on the servo error control signals, the servo 109 determines and controls the rotation speed of the optical disc 10 by using the servo drivers 107, and also adjusts the height and position of the OPU 103 for reading information from the optical disc 10.

The read channel 111 extracts bit clock and bit data information recorded on the optical disc 10. The read channel 111 also performs analog-to-digital conversion of the input analog signal. The digital bit stream generated by the read channel 111 is applied to the CD/DVD process unit 121, HDDVD process unit 123, or BD process unit 125, depending on the operation mode of the integrated apparatus. For example, if the optical disc 10 is a CD or DVD, the digital bit stream will be transmitted to the CD/DVD process unit 121.

The CD/DVD process unit 121, HDDVD process unit 123 and BD process unit 125 are used to perform sync detection and demodulation function on the incoming digital data. The CD/DVD ECC engine 141, HDDVD ECC engine 143 and BD ECC engine 145 are responsible for performing error detection and correction for the digital data.

The microprocessors 151, 153, 155 are responsible for controlling the operation procedures of the CD/DVD process unit 121, HDDVD process unit 123 and BD process unit 125, respectively. And, the memory units 131, 133, 135 provide memory resources for storing the digital data processed by the CD/DVD process unit 121, HDDVD process unit 123 and BD process unit 125.

Finally, after processed by the CD/DVD process unit 121, HDDVD process unit 123 or BD process unit 125, the digital data is passed to the selector 113. Depending on the operation mode of the integrated apparatus, the selector 113 will automatically switch to the CD/DVD process unit 121, HDDVD process unit 123, or BD process unit 125 to receive the digital data. Then, the selector 113 will deliver the digital data to the external system via the external interfaces (not shown) respectively corresponding to the CD/DVD process unit 121, HDDVD process unit 123 and BD process unit 125.

However, since the conventional structure of the integrated apparatus uses multiple memory units, microprocessors and ECC engines, the complexity, power consumption and cost of the integrated apparatus are high and can't be reduced. Besides, the conventional integrated apparatus needs to use different external interfaces to transmit the digital data in the different modes. That promotes the requirements and cost of the external system insidiously.

Accordingly, as discussed above, the prior art still has some drawbacks that could be improved. The present invention aims to resolve the drawbacks in the prior art.

SUMMARY OF THE INVENTION

An objective of the present invention is to provide an integrated apparatus for multi-standard optical media. The integrated apparatus of the present invention uses a shared ECC engine to decode the digital data read from CD, DVD, HDDVD or BD for data correction or to encode user data for data recording. Thereby, the complexity and cost of the integrated apparatus can be reduced.

Another objective of the present invention is to provide an integrated apparatus for multi-standard optical media. The integrated apparatus of the present invention uses a single memory unit to store the digital data read from CD, DVD, HDDVD or BD or to store the inputted user data. Thereby, the complexity and cost of the integrated apparatus can be reduced.

Still another objective of the present invention is to provide an integrated apparatus for multi-standard optical media. In the present invention, the shared ECC engine inside the integrated apparatus has integrated syndrome/parity and erasure generators to obtain the syndrome and error position information of the digital data read from the optical disc or to encode the user data. Thereby, the complexity and cost of the integrated apparatus can be reduced.

Still another objective of the present invention is to provide an integrated apparatus for multi-standard optical media. The integrated apparatus of the present invention uses an integrated host interface to transfer the data stream for CD, DVD, HDDVD or BD. Thereby, the number of necessary data transmission interfaces can be reduced.

For reaching the objective above, the present invention provides an integrated apparatus for multi-standard optical media. It includes a compact disc/digital versatile disc (CD/DVD) processor capable of processing a CD/DVD data stream; a high-definition DVD (HDDVD) processor capable of processing a HDDVD data stream; a Blu-ray disc (BD) processor capable of processing a BD data stream; a memory unit connected to the CD/DVD processor, the HDDVD processor and the BD processor to provide a storage resource; and a shared error correction code (ECC) engine for encoding or decoding the CD/DVD data stream, the HDDVD data stream and the BD data stream.

Therein, the ECC engine further has a syndrome/parity generator to encode the CD/DVD data stream, the HDDVD data stream or the BD data stream or to obtain the syndrome information from them; and an erasure generator to obtain the error position information from the syndrome information. In addition, the integrated apparatus of the present invention further has a host interface to transfer the data stream read from CD/DVD, HDDVD and BD or the user data.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1:
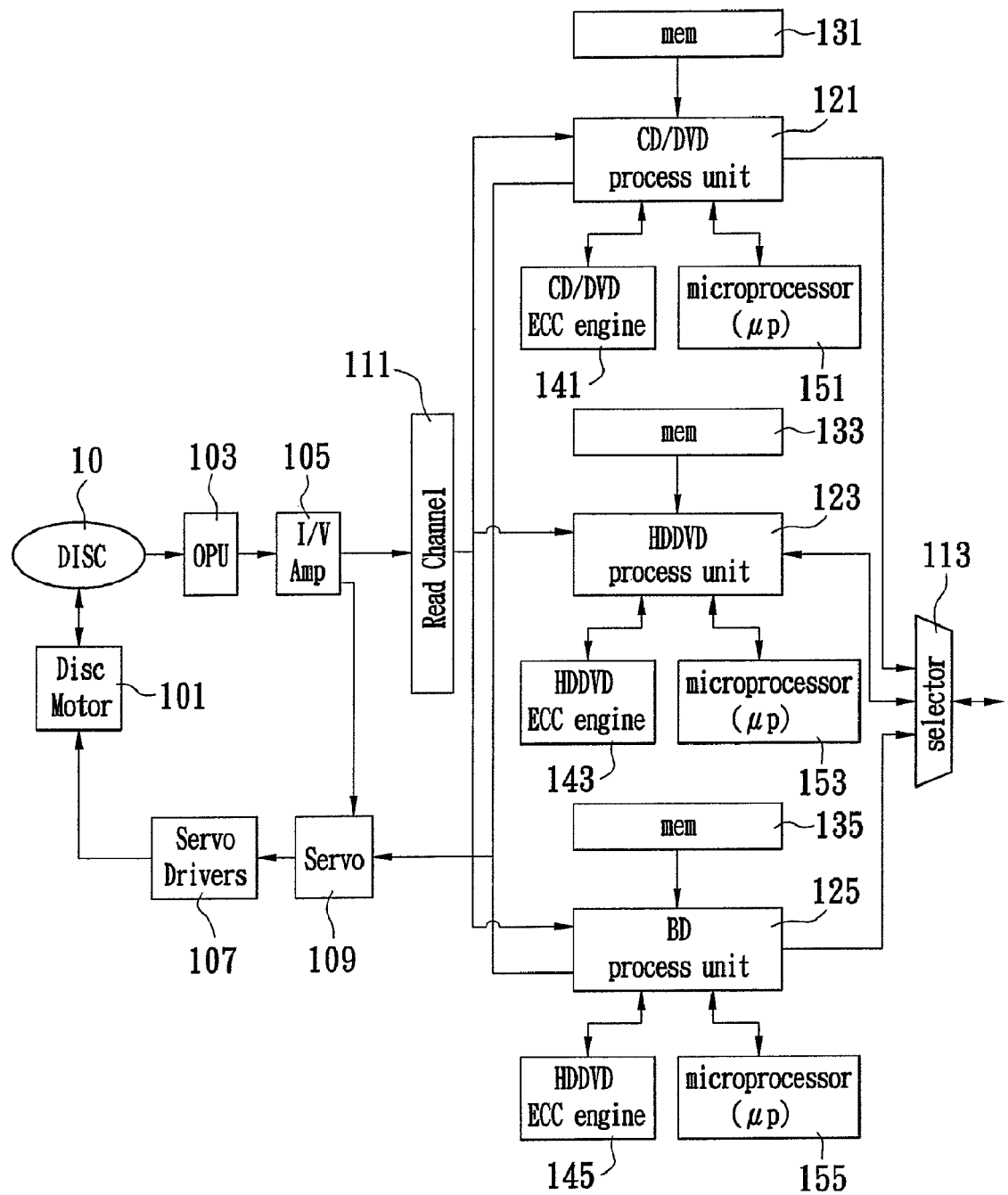
FIG. 1 is a schematic diagram of a conventional integrated apparatus for multi-standard optical media.
Figure 2:
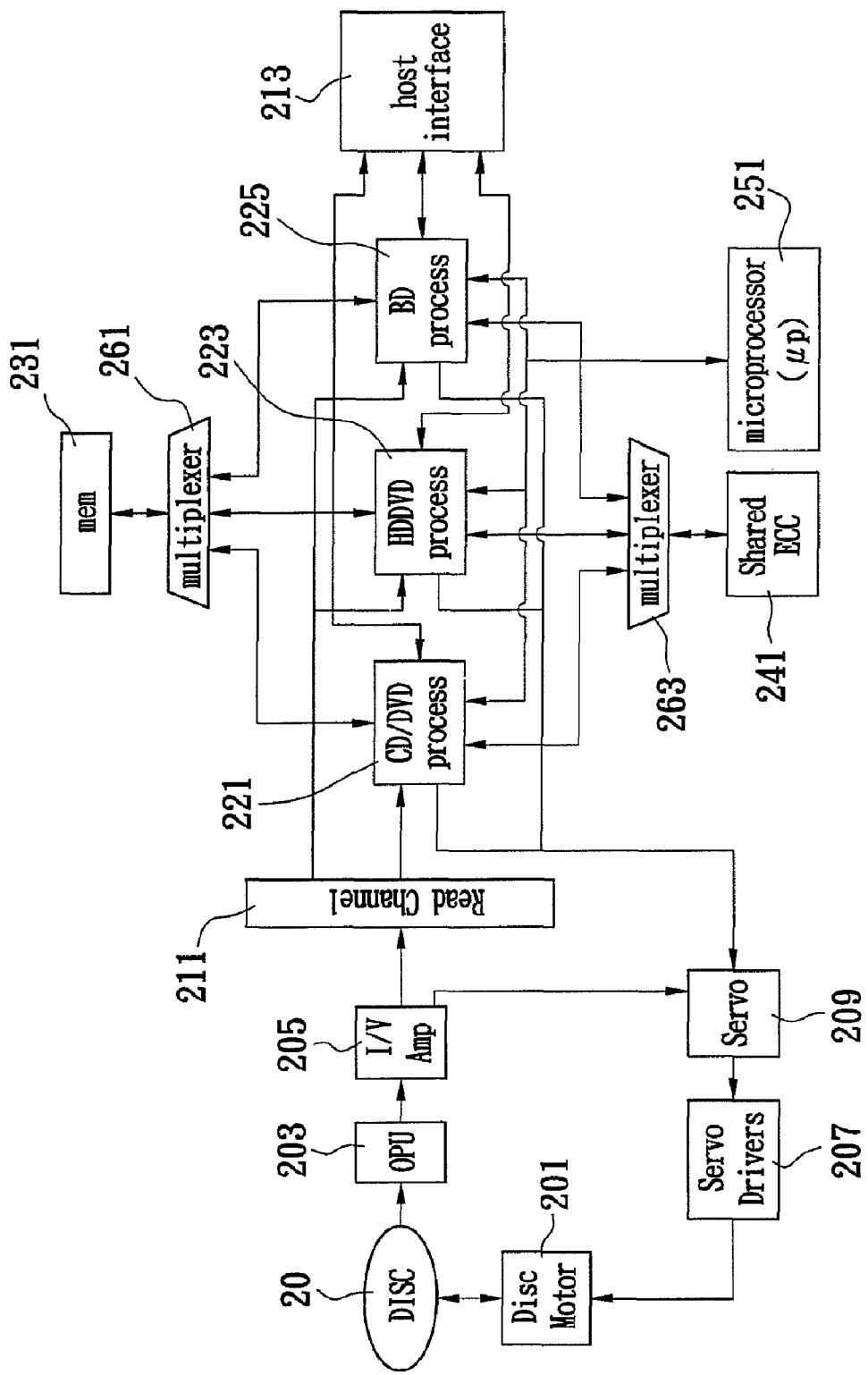
FIG. 2 is a block diagram of a preferred embodiment of an integrated apparatus for multi-standard optical media in accordance with the present invention.

Reference is made to FIG. 2, which is a block diagram of an embodiment in accordance with the present invention. As shown in the figure, in order to pick up data recorded on an optical disc 20, the integrated apparatus of the present invention includes a disc motor 201, an optical pickup unit (OPU) 203, a current/voltage amplifier (I/V Amp) 205, servo drivers 207, a servo 209 and a read channel 211.

In order to decode/encode the data of the optical disc 20, the integrated apparatus of the present invention includes a CD/DVD processor 221, a HDDVD processor 223, a BD processor 225, a memory unit (mem) 231, a shared error code correction and detection (ECC) engine 241, a microprocessor (µp) 251, multiplexers 261, 263 and a host interface 213.

The optical disc 20 can be a CD, a DVD, a HDDVD or a BD. The disc motor 201 typically includes a spindle motor, which rotates the optical disc 20 at a desired speed. The servo drivers 207 output an electric current to the disc motor 201 to drive and control the rotation rate the disc motor 201. The servo drivers 207 also output an electric current to the OPU 203 to position the OPU 203 on the desired location of the optical disc 20, to focus the laser beam onto the optical disc 20, and to track the recorded spiral pits on the optical disc 20.

As the optical disc 20 rotates, the OPU 203 reads information stored on the CD, DVD, HDDVD or BD by scanning the pits and lands on the optical disc 20. The OPU 203 may contain one or more lasers, optical elements, and associated electronic circuitry, and reads the information stored on the optical disc 20 by detecting the laser beam reflected from the optical disc 20. The OPU 203 is usually mounted on a sled, which physically positions OPU 203 over the optical disc 20. The OPU 203 is capable of reading information from the CD, DVD, HDDVD and BD.

The current/voltage amplifier 205 converts the photo-diode currents generated by the reflected laser beam into voltages, which are delivered to the read channel 211, and generates servo error control signals, which are fed back to the servo 209. The servo error control signals include a focus error signal, a tracking error signal, and a track-crossing pulse. Based on the servo error control signals, the servo 209 determines and controls the rotation speed of the optical disc 20 by using the servo drivers 207, and also adjusts the height and position of the OPU 203 for reading information from the optical disc 20.

The read channel 211 extracts bit clock and bit data information recorded on the optical disc 20. The read channel 211 also performs analog-to-digital conversion of the input analog signal. The digital bit stream generated by the read channel 211 is applied to the CD/DVD processor 221, HDDVD processor 223, or BD processor 125, depending on the operation mode of the integrated apparatus. For example, if the optical disc 20 is a CD or DVD, the digital bit stream will be transmitted to the CD/DVD processor 221.

The CD/DVD processor 221, HDDVD processor 223 and BD processor 225 are used to perform sync detection and demodulation function on the incoming digital data. The shared ECC engine 241 is responsible for performing error detection and correction for the digital data or encoding the user data. The CD/DVD processor 221, HDDVD processor 223 and BD processor 225 can pass the digital data to the shared ECC engine 241 via the multiplexer 263. It should be noted that in practice the CD/DVD processor 221 could be a CD processor, a DVD processor or a combination of them.

The microprocessor 251 is responsible for controlling the operation procedures of the CD/DVD processor 221, HDDVD processor 223 and BD processor 225. And, the memory unit 231 provides memory resources for storing the digital data processed by CD/DVD processor 221, HDDVD processor 223 and BD processor 225. Therein, the CD/DVD processor 221, HDDVD processor 223 and BD processor 225 can read/write the related data from/to the memory unit 231 via the multiplexer 261.

Finally, after processed by the CD/DVD processor 221, HDDVD processor 223 and BD processor 225, the digital data is passed to the host interface 213. Depending on the operation mode, the host interface 213 will automatically switch to the CD/DVD processor 221, HDDVD processor 223 and BD processor 225 to receive the digital data. Then, host interface 213 will directly deliver the digital data to the external system.

It should be noted that the host interface 213 is an integrated interface suitable for transferring the data stream read from CD/DVD, HDDVD and BD or the user data. It can automatically adjust its data transmission speed and protocol according to the operation mode. Thereby, the present invention can reduce the number of necessary hardware for data transmission.

Furthermore, the shared ECC engine 241 is capable of processing various kinds of the Reed-Solomon (RS) codes with different lengths or different decoding capabilities for CD/DVD, HDDVD and BD. Please refer to FIG. 3A, which shows structures of RS codes for various optical disc standards. It should be noted that the present invention uses the same RS engine to process digital data with byte-based or nibble-based data format.

Figures 3A, 3B:
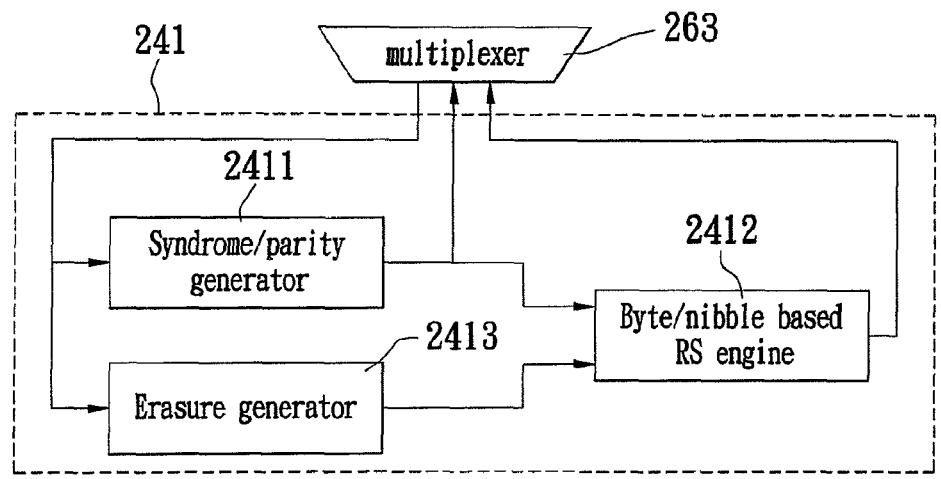
FIG. 3A shows structures of RS codes for various optical disc standards.
FIG. 3B is an internal diagram of the first embodiment of the shared ECC engine in accordance with the present invention.

Reference is made to FIG. 3B, which is an internal diagram of the first embodiment of the shared ECC engine in accordance with the present invention. Therein, the shared ECC engine 241 includes a syndrome/parity generator 2411, an erasure generator 2413 and a byte/nibble based RS engine 2412. Suppose that the digital data is read from the optical disc 10. The CD/DVD processor 221, HDDVD processor 223 or BD processor 225 will deliver the digital data to the shared ECC engine 241 via the mulitplexer 263, and the shared ECC engine 241 will operate as follows.

First, the digital data will be passed to the syndrome/parity generator 2411 and the erasure generator 2413 at the same time to obtain the syndrome information and erasure information of the digital data and then the syndrome/parity generator 2411 and the erasure generator 2413 will pass the error information, i.e. the syndrome information or erasure information, of the digital data to byte/nibble based RS engine 2412 to find the error pattern of the digital data. Therein, the unit can be a byte, i.e. 8 bits, or a nibble, i.e. 4 bits. It means that the data format of the digital data can be byte-based or nibble-based. Finally, the error pattern will be sent back to the CD/DVD processor 221, HDDVD processor 223 or BD processor 225 to correct the data read from the optical disc 10.

On the contrary, suppose the integrated apparatus is going to record the user data onto the optical disc 10. The CD/DVD processor 221, HDDVD processor 223 or BD processor 225 will deliver the user data to the shared ECC engine 241 via the mulitplexer 263. Then, the syndrome/parity generator 2411 will encode the user data to produce the corresponding parity data and send them back to the CD/DVD processor 221, HDDVD processor 223 or BD processor 225 for data recording.

During data encoding, the present invention can stop sending clock pulses to the erasure generator 2413 and the byte/nibble based RS engine 2412 and only send the clock pulses to the syndrome/parity generator 2411. Thus, the present invention can reduce the power consumption during encoding. Furthermore, during encoding, the syndrome/parity generator 2411 switches its output to multiplexer 263 and directly sends back the parity data to the CD/DVD processor 221, HDDVD processor 223 or BD processor 225 via the multiplexer 263. On the contrary, during decoding, the syndrome/parity generator 2411 switches its output back to the byte/nibble based RS engine 2412.

The present invention uses an integrated circuit, i.e. the syndrome/parity generator 2411, to provide both the syndrome and parity generating functions. Thereby, the present invention can further reduce the complexity and cost of the integrated apparatus. However, the present invention is not limited in this structure. The present invention can also use two separate circuits to implement the syndrome and parity generating functions.

Figure 3C:
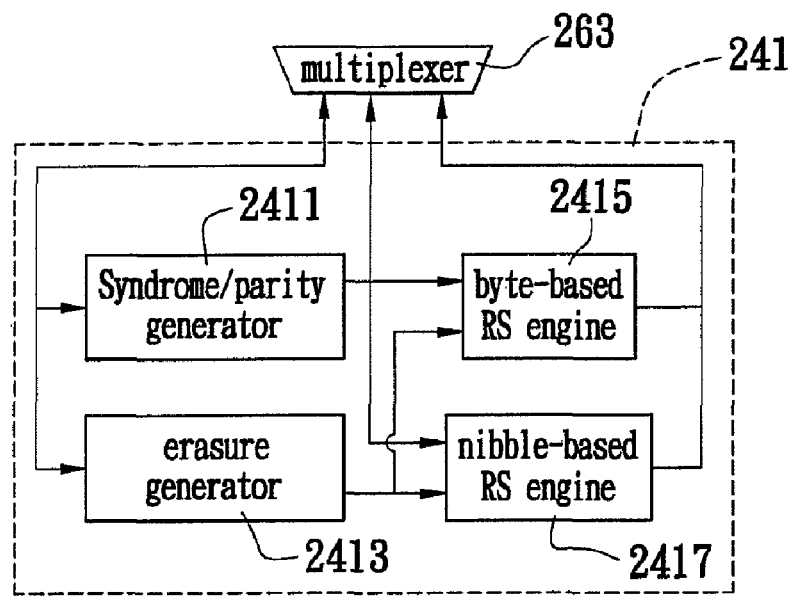
FIG. 3C is an internal diagram of the second embodiment of the shared ECC engine in accordance with the present invention.

Reference is made to FIG. 3C, which is an internal diagram of a second embodiment of the shared ECC engine in accordance with the present invention. Therein, the shared ECC engine 241 includes a syndrome/parity generator 2411, an erasure generator 2413, a byte-based Reed-Solomon (RS) engine 2415 and a nibble-based RS engine 2417. Suppose that the digital data is read from the optical disc 10. The CD/DVD processor 221, HDDVD processor 223 or BD processor 225 will deliver the digital data to the shared ECC engine 241 via the mulitplexer 263, and the shared ECC engine 241 will operate as follows.

First, the digital data will be passed to the syndrome/parity generator 2411 and the erasure generator 2413 to obtain the syndrome information and erasure information of the digital data. Then the syndrome/parity generator 2411 and the erasure generator 2413 will pass the syndrome information and the erasure information to the byte-based Reed-Solomon (RS) engine 2415 or the nibble-based RS engine 2417 to find the error pattern of the digital data. Therein, the unit can be a byte, i.e. 8 bits, or a nibble, i.e. 4 bits. Finally, the error pattern will be sent back to the CD/DVD processor 221, HDDVD processor 223 or BD processor 225 to correct the digital data read from the optical disc 10. For a nibble-based data, the byte-based RS engine 2415 can be power down to reduce power consumption.

On the contrary, suppose the integrated apparatus is going to record the user data onto the optical disc 10. The CD/DVD processor 221, HDDVD processor 223 or BD processor 225 will deliver the user data to the shared ECC engine 241 via the mulitplexer 263. Then, the syndrome/parity generator 2411 will encode the user data to produce the corresponding parity data and send them back to the CD/DVD processor 221, HDDVD processor 223 or BD processor 225 for data recording.

The present invention uses an integrated circuit, i.e. the syndrome/parity generator 2411, to provide the syndrome and parity generating functions. Thereby, the present invention can further reduce the complexity and cost of the integrated apparatus. However, the present invention is not limited in this structure. The present invention can also use two separate circuits to implement the syndrome and parity generating functions.

Figure 3D:
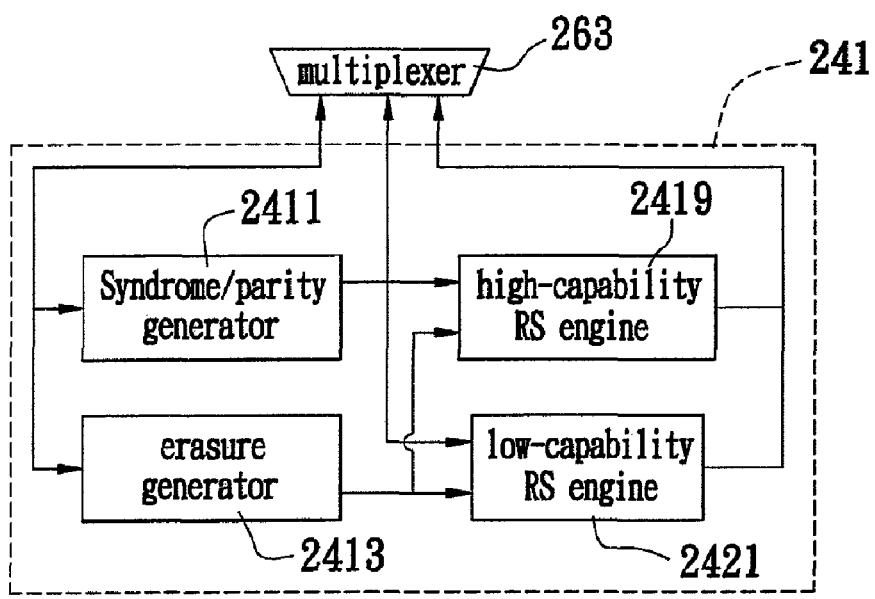
FIG. 3D is an internal diagram of the third embodiment of the shared ECC engine in accordance with the present invention.

Reference is made to FIG. 3D, which is an internal diagram of a third embodiment of the shared ECC engine in accordance with the present invention. Therein, the shared ECC engine 241 includes a syndrome/parity generator 2411, an erasure generator 2413, a high-capability RS engine 2419 and a low-capability RS engine 2421. Suppose that the digital data is read from the optical disc 10. The CD/DVD processor 221, HDDVD processor 223 or BD processor 225 will deliver the digital data to the shared ECC engine 241 via the mulitplexer 263, and the shared ECC engine 241 will operate as follows.

First, the digital data will be passed to the syndrome/parity generator 2411 and the erasure generator 2413 to obtain the syndrome information and erasure information i.e. possible error position information, of the digital data. The RS engines can use the erasure information to enhance the decoding capability. The syndrome information and the erasure information will be passed to the high-capability RS engine 2419 or the low-capability RS engine 2421 to find the error pattern of the digital data. Finally, the error pattern will be sent back to the CD/DVD processor 221, HDDVD processor 223 or BD processor 225 to correct the digital data read from the optical disc 10.

On the contrary, suppose the integrated apparatus is going to record the user data onto the optical disc 10. The CD/DVD processor 221, HDDVD processor 223 or BD processor 225 will deliver the user data to the shared ECC engine 241 via the mulitplexer 263. Then, the syndrome/parity generator 2411 will encode the user data to produce the corresponding parity data and send them back to the CD/DVD processor 221, HDDVD processor 223 or BD processor 225 for data recording.

In practice, if the parity length is larger than 10 bytes, the integrated apparatus of the present invention can use the high-capability RS engine 2419 to find the error pattern. Otherwise, the integrated apparatus of the present invention can use the low-capability RS engine 2421 to find the error pattern. Thereby, the present invention can reduce the power consumption.

Since the maximum parity length that needs to be decoded during encoding/decoding CD data is 4 and the maximum parity length that needs to be decoded, say physical address information, during encoding BD/HDDVD/DVD data is 6 for nibble based and 4 for byte based, the present invention can only use the low-capability RS engine 2421 during encoding/decoding CD data or encoding BD/HDDVD/DVD data and power down the high-capability RS engine 2419. The high-capability RS engine 2419 only needs to be used during decoding BD/HDDVD/DVD data. In this way, the present invention can greatly reduce the power consumption for data encoding/decoding.

Figure 3E:
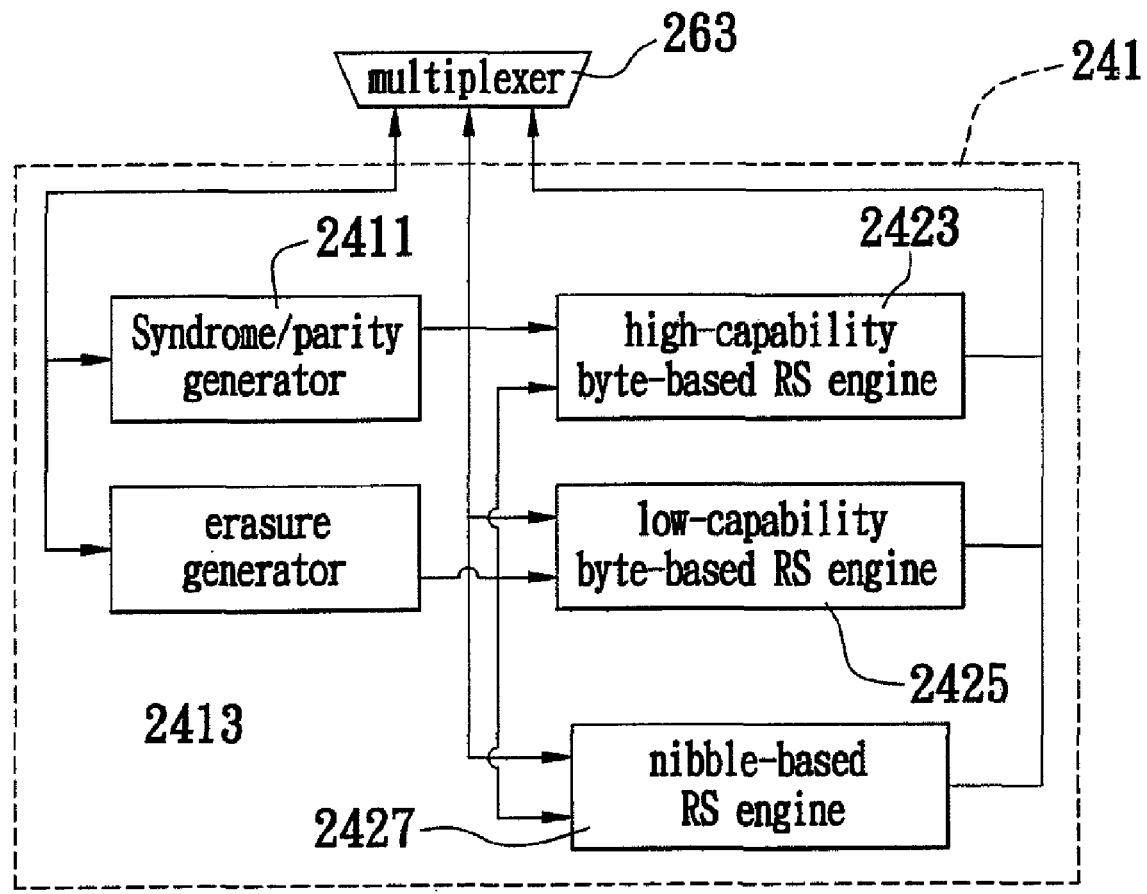
FIG. 3E is an internal diagram of the fourth embodiment of the shared ECC engine in accordance with the present invention.

Reference is made to FIG. 3E, which is an internal diagram of a fourth embodiment of the shared ECC engine in accordance with the present invention. Therein, the shared ECC engine 241 includes a syndrome/parity generator 2411, an erasure generator 2413, a high-capability byte-based RS engine 2423, a low-capability byte-based RS engine 2425, and a nibble-based RS engine 2427. Suppose that the digital data is read from the optical disc 10. The CD/DVD processor 221, HDDVD processor 223 or BD processor 225 will deliver the digital data to the shared ECC engine 241 via the mulitplexer 263, and the shared ECC engine 241 will operate as follows.

First, the digital data will be passed to the syndrome/parity generator 2411 and the erasure generator 2413 to obtain the syndrome information and erasure information of the digital data and then the syndrome/parity generator 2411 and the erasure generator 2413 will pass the error information of the digital data to the RS engines. Depending on the parity length of the Reed-Solomon codes or the unit used in the digital data or the operation mode, the erasure information will be passed to the high-capability byte-based RS engine 2423, low-capability byte-based RS engine 2425 or the nibble-based RS engine 2427 to find the error pattern of the digital data. Finally, the error pattern will be sent back to the CD/DVD processor 221, HDDVD processor 223 or BD processor 225 to correct the digital data read from the optical disc 10.

In practice, if the parity length is larger than 10 bytes and the unit used in the digital data is byte, the integrated apparatus of the present invention can use the high-capability bye-based RS engine 2423 to find the error pattern. If the parity length is smaller than 4 bytes and the unit used in the digital data is byte, the integrated apparatus of the present invention can use the low-capability bye-based RS engine 2425 to find the error pattern. Otherwise, the integrated apparatus of the present invention can use the nibble-based RS engine 2427 to find the error pattern. Thereby, the present invention can reduce the power consumption.

On the contrary, suppose the integrated apparatus is going to record the user data onto the optical disc 10. The CD/DVD processor 221, HDDVD processor 223 or BD processor 225 will also deliver the user data to the shared ECC engine 241 via the mulitplexer 263. Then, the syndrome/parity generator 2411 will encode the user data to produce the corresponding parity data and send them back to the CD/DVD processor 221, HDDVD processor 223 or BD processor 225 for data recording.

Figure 3F:
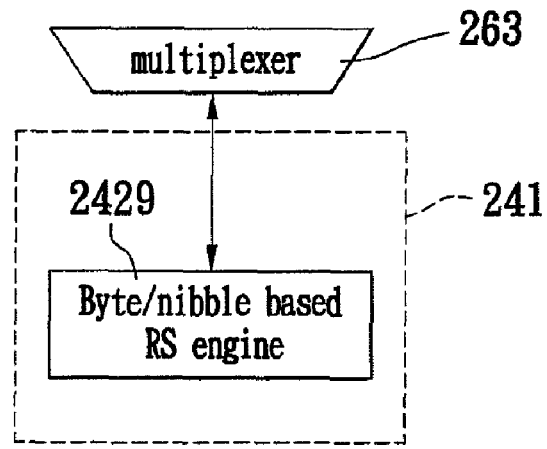
FIG. 3F is an internal diagram of the fifth embodiment of the shared ECC engine in accordance with the present invention.

Reference is made to FIG. 3F, which is an internal diagram of the fifth embodiment of the shared ECC engine in accordance with the present invention. In this embodiment, the shared ECC engine 241 only includes a byte/nibble based RS engine 2429, and the syndrome/parity generator 2411 and erasure generator 2413 of the previous embodiment are omitted. The functions or circuits of the syndrome/parity generator 2411 and erasure generator 2413 are integrated into the CD/DVD processor 221, the HDDVD processor 223 and the BD processor 225 individually.

Suppose that the digital data is read from the optical disc 10. The CD/DVD processor 221, HDDVD processor 223 or BD processor 225 will process the digital data to obtain the syndrome information and erasure information, i.e. error information. Then, the syndrome information and erasure information will be delivered to the shared ECC engine 241 via the mulitplexer 263. After the error information is received, the byte/nibble based RS engine 2429 of the shared ECC engine 241 will find the error pattern of the digital data via the error information. Therein, the unit can be a byte, i.e. 8 bits, or a nibble, i.e. 4 bits. It means that the data format of the digital data can be byte-based or nibble-based. Finally, the error pattern will be sent back to the CD/DVD processor 221, HDDVD processor 223 or BD processor 225 to correct the data read from the optical disc 10.

Figure 3G:
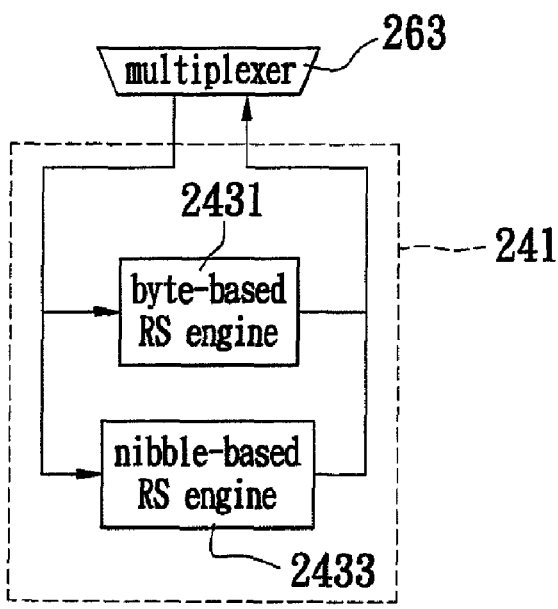
FIG. 3G is an internal diagram of the sixth embodiment of the shared ECC engine in accordance with the present invention.

Reference is made to FIG. 3G, which is an internal diagram of the sixth embodiment of the shared ECC engine in accordance with the present invention. In this embodiment, the syndrome/parity generator 2411 and erasure generator 2413 are also omitted and the shared ECC engine 241 only includes a byte-based RS engine 2431 and a nibble-based RS engine 2433. The functions or circuits of the syndrome/parity generator 2411 and erasure generator 2413 are integrated into the CD/DVD processor 221, the HDDVD processor 223 and the BD processor 225 individually.

Suppose that the digital data is read from the optical disc 10. The CD/DVD processor 221, HDDVD processor 223 or BD processor 225 will process the digital data to obtain the syndrome information and erasure information, i.e. error information. Then, the syndrome information and erasure information will be delivered to the shared ECC engine 241 via the mulitplexer 263. After the shared ECC engine 241 receives the error information, the byte-based RS engine 2431 or the nibble-based RS engine 2433 will be used to find the error pattern of the digital data. Therein, the unit can be a byte, i.e. 8 bits, or a nibble, i.e. 4 bits. Finally, the error pattern will be sent back to the CD/DVD processor 221, HDDVD processor 223 or BD processor 225 to correct the digital data read from the optical disc 10. For a nibble-based data, the byte-based RS engine 2415 can be power down to reduce power consumption.

Figure 3H:
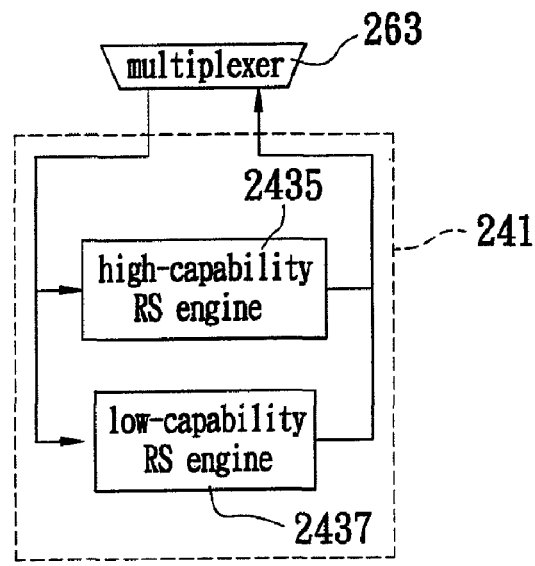
FIG. 3H is an internal diagram of the seventh embodiment of the shared ECC engine in accordance with the present invention.

Reference is made to FIG. 3H, which is an internal diagram of the seventh embodiment of the shared ECC engine in accordance with the present invention. In this embodiment, the syndrome/parity generator 2411 and erasure generator 2413 are also omitted and the shared ECC engine 241 only includes a high-capability RS engine 2435 and a low-capability RS engine 2437. The functions or circuits of the syndrome/parity generator 2411 and erasure generator 2413 are integrated into the CD/DVD processor 221, the HDDVD processor 223 and the BD processor 225 individually.

Suppose that the digital data is read from the optical disc 10. The CD/DVD processor 221, HDDVD processor 223 or BD processor 225 will process the digital data to obtain the syndrome information and erasure information, i.e. error information. Then, the syndrome information and erasure information will be delivered to the shared ECC engine 241 via the mulitplexer 263. After the shared ECC engine 241 receives the error information, the syndrome information and the erasure information will be passed to the high-capability RS engine 2435 or the low-capability RS engine 2437 to find the error pattern of the digital data. Finally, the error pattern will be sent back to the CD/DVD processor 221, HDDVD processor 223 or BD processor 225 to correct the digital data read from the optical disc 10.

In practice, if the parity length is larger than 10 bytes, the integrated apparatus of the present invention can use the high-capability RS engine 2435 to find the error pattern. Otherwise, the integrated apparatus of the present invention can use the low-capability RS engine 2437 to find the error pattern. Thereby, the present invention can reduce the power consumption.

Since the maximum parity length that needs to be decoded during encoding/decoding CD data is 4 and the maximum parity length that needs to be decoded, say physical address information, during encoding BD/HDDVD/DVD data is 6 for nibble based and 4 for byte based, the present invention can only use the low-capability RS engine 2437 during encoding/decoding CD data or find the physical address of BD/HDDVD/DVD Disc and power down the high-capability RS engine 2435. The high-capability RS engine 2435 only needs to be used during decoding BD/HDDVD/DVD data. In this way, the present invention can greatly reduce the power consumption for data encoding/decoding.

Figure 3I:
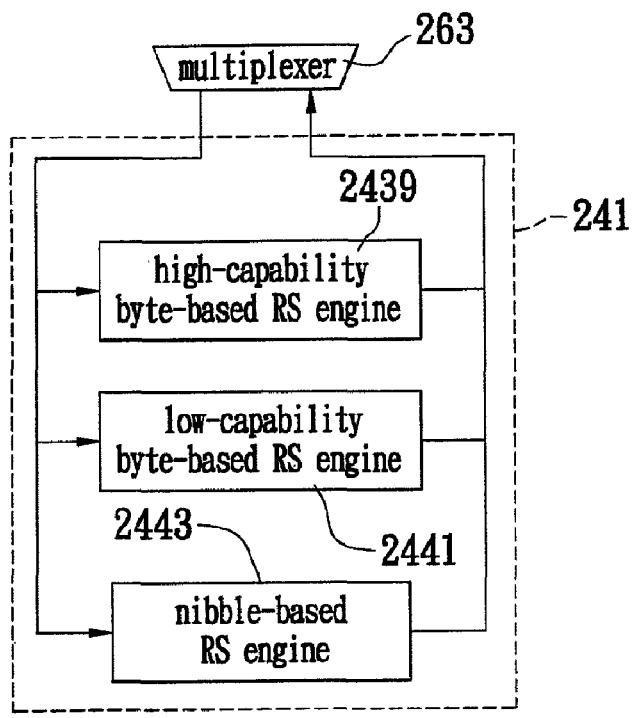
FIG. 3I is an internal diagram of the eighth embodiment of the shared ECC engine in accordance with the present invention.

Reference is made to FIG. 3I which is an internal diagram of the eighth embodiment of the shared ECC engine in accordance with the present invention. In this embodiment, the syndrome/parity generator 2411 and erasure generator 2413 are also omitted and the shared ECC engine 241 includes a high-capability RS engine 2439, a low-capability RS engine 2441 and a nibble-based RS engine 2443. The functions or circuits of the syndrome/parity generator 2411 and erasure generator 2413 are integrated into the CD/DVD processor 221, the HDDVD processor 223 and the BD processor 225 individually.

Suppose that the digital data is read from the optical disc 10. The CD/DVD processor 221, HDDVD processor 223 or BD processor 225 will process the digital data to obtain the syndrome information and erasure information, i.e. error information. Then, the syndrome information and erasure information will be delivered to the shared ECC engine 241 via the mulitplexer 263. After the shared ECC engine 241 receives the error information, the syndrome information and the erasure information will be passed to the RS engines. Depending on the parity length of the Reed-Solomon codes or the unit used in the digital data or the operation mode, the erasure information will be passed to the high-capability byte-based RS engine 2439, low-capability byte-based RS engine 2441 or the nibble-based RS engine 2443 to find the error pattern of the digital data. Finally, the error pattern will be sent back to the CD/DVD processor 221, HDDVD processor 223 or BD processor 225 to correct the digital data read from the optical disc 10.

In practice, if the parity length is larger than 10 bytes and the unit used in the digital data is byte, the integrated apparatus of the present invention can use the high-capability bye-based RS engine 2439 to find the error pattern. If the parity length is smaller than 4 bytes and the unit used in the digital data is byte, the integrated apparatus of the present invention can use the low-capability bye-based RS engine 2441 to find the error pattern. Otherwise, the integrated apparatus of the present invention can use the nibble-based RS engine 2443 to find the error pattern. Thereby, the present invention can reduce the power consumption.

Summing up, the present invention uses a single memory unit and a shared ECC engine to store and correct the digital data read from CD, DVD, HDDVD or BD. Therein, the shared ECC engine has integrated syndrome/parity and erasure generators to obtain the syndrome and error position information of the digital data read from the optical disc or to encode the user data. Further, the present invention uses an integrated host interface to transfer the data stream for CD, DVD, HDDVD or BD. Hence the present invention doesn't need to use multiple memory units, ECC engines and data transmission interfaces and can reduce the complexity and cost of the integrated apparatus for multi-standard optical media thereby.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. An integrated apparatus for multi-standard optical media, comprising:
   at least two processors selected from a group consisting of a compact disc/digital versatile disc (CD/DVD) processor, a high-definition DVD (HDDVD) processor and a Blu-ray disc (BD) processor, wherein the CD/DVD processor is capable of processing a CD/DVD data stream, the HDDVD processor is capable of processing a HDDVD data stream, and the BD processor is capable of processing a BD data stream;
   a first multiplexer; and
   an external memory unit connected to the processors via the first multiplexer to provide a storage resource.

2. The integrated apparatus as claimed in claim 1, wherein the first multiplexer automatically switches to the CD/DVD processor, the HDDVD processor or the BD processor according to an operation mode.

3. The integrated apparatus as claimed in claim 1, further comprising a shared error correction code (ECC) engine for encoding or decoding the CD/DVD data stream, the HDDVD data stream and the BD data stream.

4. The integrated apparatus as claimed in claim 1, further comprising a second multiplexer, which automatically switches to the CD/DVD processor, the HDDVD processor or the BD processor according to an operation mode.

5. The integrated apparatus as claimed in claim 1, further comprising a microprocessor for controlling an operation procedure of the CD/DVD processor, the HDDVD processor or the BD processor.

6. The integrated apparatus as claimed in claim 1, wherein the CD/DVD data stream, the HDDVD data stream or the BD data stream is read from an optical disc.

7. The integrated apparatus as claimed in claim 1, wherein the CD/DVD data stream, the HDDVD data stream or the BD data stream is user data.

8. The integrated apparatus as claimed in claim 1, wherein the external memory unit is a synchronous dynamic random access memory (SDRAM).

9. The integrated apparatus as claimed in claim 1, further comprising a Reed-Solomon (RS) engine receiving error information of the CD/DVD data stream, the HDDVD data stream or the BD data stream to find an error pattern of the CD/DVD data stream, the HDDVD data stream or the BD data stream.

10. An integrated apparatus for multi-standard optical media, comprising:
- at least two processors selected from a group consisting of a compact disc/digital versatile disc (CD/DVD) processor, a high-definition DVD (HDDVD) processor and a Blu-ray disc (BD) processor, wherein the CD/DVD processor is capable of processing a CD/DVD data stream, the HDDVD processor is capable of processing a HDDVD data stream, and the BD processor is capable of processing a BD data stream;
- a host interface to transfer at least two of the CD/DVD data stream, the HDDVD data stream and the BD data stream to/from an external system; and
- a first multiplexer connected to an external memory and capable of automatically switching to the CD/DVD processor, the HDDVD processor or the BD processor according to an operation mode.

11. The integrated apparatus as claimed in claim 10, further comprising a shared error correction code (ECC) engine for encoding or decoding the CD/DVD data stream, the HDDVD data stream and the BD data stream.

12. The integrated apparatus as claimed in claim 10, further comprising a second multiplexer, which automatically switches to the CD/DVD processor, the HDDVD processor or the BD processor according to an operation mode.

13. The integrated apparatus as claimed in claim 10, further comprising a microprocessor for controlling an operation procedure of the CD/DVD processor, the HDDVD processor or the BD processor.

14. The integrated apparatus as claimed in claim 10, wherein the CD/DVD data stream, the HDDVD data stream or the BD data stream is read from an optical disc.

15. The integrated apparatus as claimed in claim 10, wherein the CD/DVD data stream, the HDDVD data stream or the BD data stream is user data.

16. The integrated apparatus as claimed in claim 10, further comprising a Reed-Solomon (RS) engine receiving error information of the CD/DVD data stream, the HDDVD data stream or the BD data stream to find an error pattern of the CD/DVD data stream, the HDDVD data stream or the BD data stream.

* * * * *